May 21, 1929.  W. L. LOFTHOUSE  1,714,385
ELECTRIC SOLDERING IRON
Original Filed Dec. 22, 1927
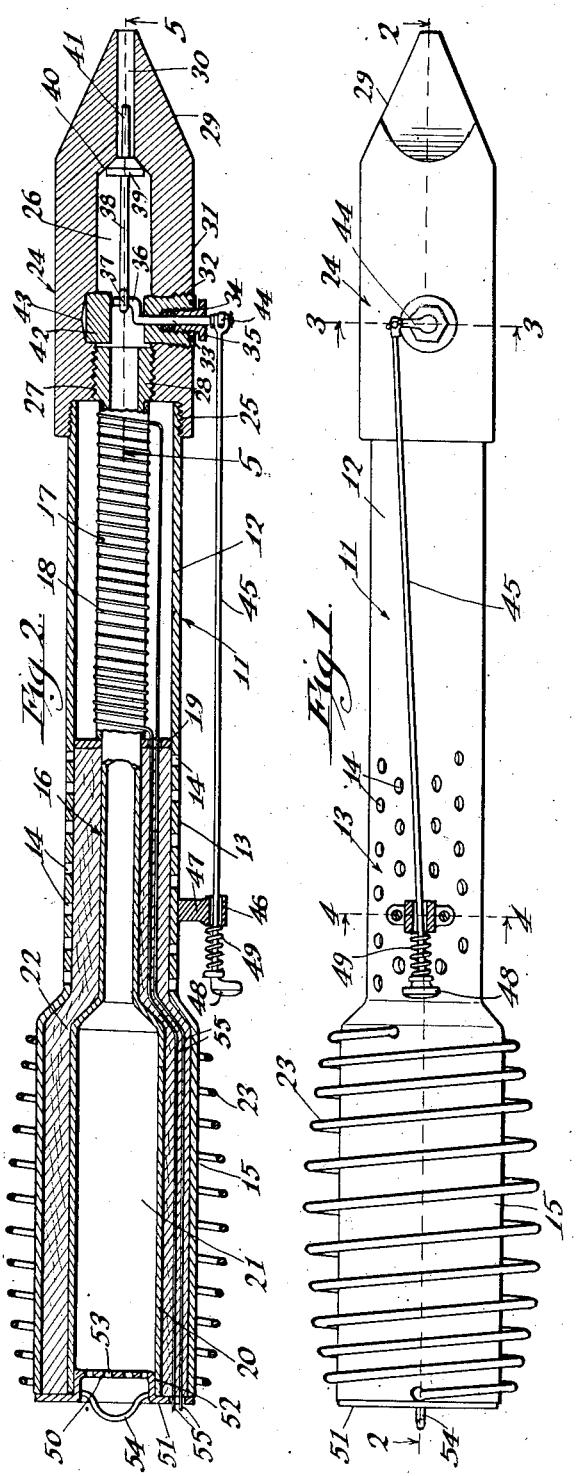
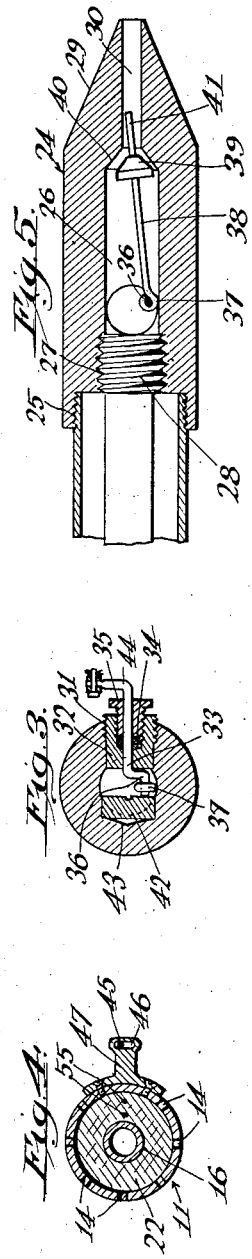
Inventor
W. L. Lofthouse.
By Hazard and Miller
Attorneys Patented May 21, 1929.

1,714,385

UNITED STATES PATENT OFFICE.

WILLIAM L. LOFTHOUSE, OF LOS ANGELES, CALIFORNIA.

ELECTRIC SOLDERING IRON.

Application filed December 22, 1927, Serial No. 241,811. Renewed April 1, 1929.

My invention is an electric soldering iron of the type in which solder is melted and maintained in the molten condition by means of electric heating elements.

An object of my invention is the construction of an electric soldering iron in which solder in the form of pellets or the like may be placed in a container and passed downwardly to the soldering point of the iron, and in such downward movement the solder is subjected to electric heating units, thereby flowing into the point in the form of molten solder.

Another object of my invention is the construction of a soldering iron having a receptacle in the point for molten solder, and with a valve, manually controllable, to run the solder from this receptacle through a duct to the operating end of the iron.

A further object of my invention is the association in combination of a soldering iron having a handle portion with a chamber therein for solder in the form of pellets, or the like, and with a tubular section with electric heating coils wound thereabout, so that the pellets will melt when passing downwardly through this tubular section to the iron point of the soldering tool. This, then, has the receptacle for the molten solder controlled by a valve. This valve is preferably operated by a crank which is journaled in the point and the crank is controlled by an operating rod with a knob positioned adjacent the handle.

My soldering iron is particularly adapted for work in which the implement is held vertically or in an inclined position, with the operative end of the point down; and by means of the valve I may control the issue of solder, either in one or a few drops at a time, or I may deposit a ribbon solder for soldering seams.

My invention and the various detail improvements will be apparent from the following description and drawings, in which:

Figure 1 is a side elevation of the iron.

Fig. 2 is a longitudinal section taken substantially on the line 2—2 of Fig. 1 in the direction of the arrows.

Fig. 3 is a transverse section on the line 3—3 of Fig. 1 in the direction of the arrows through the crank, the journal and the point.

Fig. 4 is a transverse section on the line 4—4 of Fig. 1 in the direction of the arrows.

Fig. 5 is a longitudinal section on the line 5—5 of Fig. 2 in the direction of the arrows, showing the valve in the open position.

The soldering tool has an outer casing 11, the lower portion 12 of this being tubular and imperforate, and a higher section 13 being tubular and having perforations 14. This terminates in an enlarged hand grip section 15. Concentric with the casing there is a tubular solder holder 16, the lower section of which has a suitable covering 17 with the electric heating wires 18 coiled thereon. This is held concentric by means of a partition 19. At the upper end the solder holder has an enlargement 20 forming a solder chamber 21. In the space between the casing and the solder holder there is a layer of heat insulating material such as asbestos 22. In order to obtain a cool hand hold the wire coil 23 is wound on the hand grip.

The iron or point 24 has an upper internally threaded section 25 which engages threads on the section 12 of the casing 11, and has an internal receptacle 26 which, at its upper end, is screw-threaded as indicated at 27 and in this section 27, the threaded end 28 of the solder holder 16 is threaded. The iron has a tapered end 29 with a duct 30 leading therethrough.

In one side of the iron there is an opening 31 with a journal bushing 32 screwed therein. Through this journal bushing there extends a crank shaft 33 having suitable packing 34 and a packing gland 35. This shaft has an interior crank 36 on which there is hooked an eye 37 of the valve stem 38, this stem having a valve plug 39 thereon adapted to fit in a valve seat 40; the lower end 41 of the stem extending into the duct 30. A button 42 is fitted in a recess 43 in the point of the iron opposite the journal bushing 31, and the end of the crank 36 fits close to this button so that the eye 37 cannot slip off the crank.

There is an external crank 44 on the crank shaft and this is connected to an operating rod 45 by a pivotal connection, this operating rod being slidably mounted in a guide opening 46 in a bracket 47 secured to the section 13 of the casing 11. The operating rod has a head 48 and there is a compression spring 49 on the rod between the bracket and the head.

The chamber of the iron is filled by removing the cover cap 50 which has a flange 51 extending over the ends of the hand grip section 15 of the casing 11 and the end of the tubular section 20 of the chamber 21. This has a pressed fit at the section as indicated at 52 and has perforations 53. A finger grip 54 may be utilized to insert and remove the cap. Electric leads 55 for the heating units pass through the heat insulating material between the casing 11 and the solder chamber.

The manner of using and functioning of the iron is substantially as follows:

It is intended that rather coarse pellets of solder be inserted in the chamber 21 by removing the cap 50, which is then replaced. The electric current heats the wires of the heating unit so that when the iron is tilted or held with the point down, the solder is melted and the molten solder drops into the receptacle 26 of the point. While the solder is melting, the valve is kept closed as illustrated in Fig. 2. When sufficient molten solder has accumulated and the point of the iron is sufficiently hot, by conduction of heat from the heating unit the valve may be operated to open by pressing downwardly on the head 48 of the operating rod 45, which action draws the valve plug upwardly in the position shown in Fig. 5, thus allowing solder to pass outwardly through the duct 30.

It is obvious that by proper manipulation of the valve that a small amount of solder may be deposited on the work in hand, or a continuous ribbon of solder may be deposited for soldering seams. It is also to be understood that instead of using pellets of solder, solder wire may be inserted through the chamber 21 and into the heating section of the solder holder 16. The solder manifestly may be in any suitable form.

The heat developed is radiated through the perforations 14 of the section 13 of the casing and, moreover, on account of the cool solder being in the chamber 21 the hand grip part of the iron does not become excessively hot. It will also be noted that the crank shaft may be readily assembled with the point and also that the different elements of the iron may be readily disassembled and assembled, one relative to the other.

Various changes may be made in the principles of my invention without departing from the spirit thereof, as set forth in the description, drawings and claims.

I claim:

1. A soldering iron comprising in combination a point having a receptacle for molten solder and a discharge duct in alignment therewith, said point having a lateral opening with a journal bushing fitted therein, a crank shaft journaled in said bushing having an internal crank with a valve stem connected thereto, said stem having a valve plug to close the said duct, a handle connected to the point, means in the handle to melt solder, and means on the outside of the handle to operate the said crank shaft.

2. A soldering iron, as claimed in claim 1, the means to operate the crank shaft comprising a bracket mounted on the handle having a guide opening therethrough, an operating rod slidably mounted in said opening, said rod being connected to an external crank on the crank shaft.

3. A soldering iron having a tubular casing with a tubular solder holder concentric therein, a point having a threaded connection to the casing and a threaded connection to the lower end of the solder holder, said point having a receptacle for molten solder with a discharge duct therefrom, a valve having a stem to control said duct, a crank shaft connected to the stem journaled in the point, an electric heating unit on the lower part of the solder holder, an operating rod connected to the said crank shaft, said operating rod being supported adjacent the upper end of the casing.

4. A soldering iron comprising in combination a tubular casing having an enlarged hand grip end, a tubular solder holder having an enlarged chamber in the hand grip end and a part of smaller diameter in the lower part of the casing, an electric heating unit in the form of a coil on the lower part of the solder holder, a partition at one end of said unit, an insulating filling between the casing and the solder holder above the partition, a cap forming a closure for the upper part of the solder holder, a hollow soldering point having a receptacle for molten solder connected to the casing and to the solder holder having a valve therein, and means on the exterior of the casing to operate said valve.

5. In a soldering iron, a point having a receptacle for molten solder, a duct leading therefrom with a valve seat at the duct, said point having a lateral opening, a bushing mounted therein, a crank shaft journaled in said bushing and having an internal crank, a stem connected to the crank having a valve plug thereon, means to flow molten solder into the said receptacle, and means connected to the crank shaft to operate the stem.

6. In a soldering iron, as claimed in claim 5, the point having a recess opposite the said opening with a button mounted therein, the said button being adapted to engage the end of the crank and prevent disconnection of the valve stem and the crank.

In testimony whereof I have signed my name to this specification.

WILLIAM L. LOFTHOUSE.